United States Patent
Jonnala et al.

(10) Patent No.: US 8,108,865 B2
(45) Date of Patent: Jan. 31, 2012

(54) PROCESS REPLICATION METHOD AND SYSTEM

(75) Inventors: Uday Kiran Jonnala, Bangalore Karnataka (IN); Dileep Prabhakaran Thekkemuriyil, Bangalore Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 1235 days.

(21) Appl. No.: 11/777,480

(22) Filed: Jul. 13, 2007

(65) Prior Publication Data

US 2008/0028406 A1 Jan. 31, 2008

(30) Foreign Application Priority Data

Jul. 31, 2006 (IN) .......................... 1340/CHE/2006

(51) Int. Cl.
*G06F 9/46* (2006.01)
(52) U.S. Cl. ..................................................... 718/102
(58) Field of Classification Search .................. None
See application file for complete search history.

(56) References Cited

U.S. PATENT DOCUMENTS

| 6,473,819 | B1 * | 10/2002 | Jackson et al. ............... 710/200 |
| 7,185,339 | B2 * | 2/2007 | Srivastava et al. ............ 718/104 |
| 2007/0192524 | A1 * | 8/2007 | Chan et al. .................... 710/200 |

OTHER PUBLICATIONS

"pthread_atfork", The Open Group Base Specifications Issue 6, IEEE Std 1003.1, 2004 Edition, Copyright 2001-2004.*

* cited by examiner

*Primary Examiner* — Emerson Puente
*Assistant Examiner* — Gregory Kessler

(57) ABSTRACT

A process replication method for use in a multi-threaded computing environment, for improving application performance, reducing the number of deadlocks and fork safing code. The method comprises acquiring and locking available mutexes from a plurality of mutexes, determining whether any unavailable mutexes from the plurality of mutexes are held by a thread that is waiting for a mutex owned by a forking thread and, if so, ceding any such mutex to the respective waiting thread and boosting priority of the waiting thread, and registering the forking thread as first waiter for any unavailable mutexes. All of the plurality of mutexes are thereby eventually acquired and locked.

9 Claims, 4 Drawing Sheets

PROCESS REPLICATION METHOD AND SYSTEM

RELATED APPLICATIONS

The present application is based on, and claims priority from, Indian Application Number 1340/CHE/2006, filed Jul. 31, 2006, the disclosure of which is hereby incorporated by reference herein in its entirety.

FIELD OF THE INVENTION

The present invention relates to a process replication method and system, of particular application in making process replication faster and simpler in a multi-threaded program.

BACKGROUND OF THE INVENTION

In a multi-threaded program that employs fork-safe application program interfaces, process replication tends to be relatively slow. The process of fork-safing libraries is complex, leading to deadlocks owing to mutex ordering during process replication. As will be familiar to those in the art, a mutex (or 'mutual exclusion lock') prevents multiple threads from simultaneously executing portions of code that access shared data, and so serialize the execution of threads.

In one existing approach, to fork-safe a multi-threaded application, an application developer uses the atfork( ) handlers provided in the particular thread implementation (pthread_atfork( ) in the case of POSIX threads). The application developer must ensure that only fork-safe APIs are called between fork and exec in the child process; the developer must also ensure that either the fork-safe libraries do not have any dependencies or—if they do—that the atfork handlers are installed in the correct order.

The pthread-atfork( ) function allows an application to install fork handlers by registering handler functions to be called just before and just after a new process is created with a fork( ) operation. These fork handlers are thus called before and after a fork( ) operation, and in the context of the thread calling fork( ). As with atexit( ) handlers, the application does not need to do anything special for these fork handlers to be called; they are invoked by the system when a fork( ) operation occurs. Thus, pthread_atfork( ) is defined as follows:

```
int pthread_atfork(
    void (*prepare) (void),
    void (*parent) (void),
    void (*child) (void),
);
```

The 'prepare' handler is called before performing the fork( ), the 'parent' handler is called in the parent process after performing the fork( ) and the 'child' handler is called in the child process after performing the fork( ).

All multi-threaded applications that call fork( ) in a POSIX threads program, and do more than simply call exec(2) in the child of the fork, must ensure that the child is protected from deadlock. Since some thread-replication implementations duplicate only the thread that called fork( ), it is possible that—at the time of the call—another thread in the parent will own a lock. This thread is not duplicated in the child, so no thread will unlock this lock in the child. Deadlock occurs if the single thread in the child needs this lock.

This scenario is illustrated schematically at 100 in FIG. 1. Referring to FIG. 1, mutex m1 is locked by thread T2 in the parent process at time t1. The fork( ) is being done by thread T1 in the parent process at time t2. Since only the forking thread will be replicated, the child process has only one thread, T1. Thread T2 releases mutex m1 at time t3, but this is not reflected in the child process. Hence, at time t4, when thread T1 in the child process tries to lock m1, a deadlock results.

The problem is more serious with locks in libraries. A library writer does not know if the application using the library calls fork( ), so the library must protect itself from such a deadlock scenario. If the application that links with this library calls fork( ) and does not call exec( ) in the child, and if it needs a library lock that may be held by some other thread in the parent that is inside the library at the time of the fork, the application deadlocks inside the library. Such a scenario is depicted schematically in FIG. 2. Thus, referring to FIG. 2, by the time t2, when a fork( ) is called in thread T1, the lock m1 inside the library is in a locked state, since it was locked by thread T2 at the time t1. Even though T2 unlocks m1 at time t3, it is not reflected in the child thread T1. A further call to library_API_call( ) in child thread T1[[.]] leads to a deadlock.

In order to make a library safe with respect to fork( ) by using pthread_atfork( ), one must:

(1) identify all locks used by the library (e.g. {L1, L2, . . . , Ln}) and their locking order; and (2) add a call to pthread_atfork(f1, f2, f3) in the library's .init section, where f1, f2, f3 are defined as follows:

```
f1( )
{
    /* ordered in lock order */
    pthread_mutex_lock(L1);
    pthread_mutex_lock(...);
    pthread_mutex_lock(Ln);
f2( )
{
    pthread_mutex_unlock(L1);
    pthread_mutex_unlock(...);
    pthread_mutex_unlock(Ln);
f3( )
{
    pthread_mutex_unlock(L1);
    pthread_mutex_unlock(...);
    pthread_mutex_unlock(Ln);
}
```

With this approach, the forking thread will await block on these mutexes, will lock it when available, and then will release these locks in both parent and child. In the child, attempting to lock these mutexes will not lead to a deadlock as these locks are available in an unlocked state. This approach is depicted schematically in FIG. 3. Referring to FIG. 3, mutex m1 is locked in thread T2 at time t1. Fork is called at t2 in thread T1. Since this particular mutex has an associated mutex lock in the atfork handler, the fork cannot proceed further. It waits on mutex m1, which is unlocked by thread T2 at time t3. Subsequently thread T1 gets lock m1 at time t4 and continues with the fork. It does the unlocking of mutex m1 in both child and parent at time t5 by means of atfork unlock. After that, a mutex_lock(m1) is called by T1 in the child process at time t6, but this does not lead to a deadlock as m1 is in an unlocked state by that time.

This approach solves the problem but has the following disadvantages:

(1) A multi-threaded application takes a considerable time to effect process replication if the application uses fork-safe libraries that have too many locks that must be fork-safed, because it has to acquire and release the required locks. The forking thread will sequentially block on all the unavailable mutexes and the fork will be delayed till all the mutexes are available.

(2) It is difficult to fork-safe a library if it has dependency on some other library; a library developer must collaborate with other library developers to determine if it is possible to install atfork( ) handlers to avoid a deadlock in customer applications.

This requires co-ordinating which atfork( ) handlers are installed first, based on the order locks are normally acquired in the code path. The order of installation of atfork( ) handlers is based on link order, and the application must ensure that the link order is correct if there is dependency between libraries that are linked.

Care must also be exercised in determining the installation order of these handlers. In particular, inter-library dependencies may cause deadlock if the atfork handlers were not executed (installed) in the correct order. The following example illustrates this effect.

(1) Thread A calls function yyy( ) in libxxx which calls libc's malloc( ) routine. The function yyy( ) acquires the yyy_lock prior to calling malloc( ).

(2) Meanwhile, thread B does a fork( ) before Thread A's call to yyy( )→malloc( ) acquires malloc_lock.

(3) If the libc "pre-fork" handler is executed before the libxxx "pre-fork" handler, then a deadlock has occurred. Libc's "pre-fork" handler will acquire malloc_lock without contention, as thread A has not yet acquired it. The libxxx "pre-fork" handler waits for the yyy_lock which cannot be released until the malloc( ) has completed. However, the malloc( ) cannot complete because its lock has already been acquired by libx's "pre-fork" handler.

Thus, Thread A has acquired yyy_lock and is blocked on malloc_lock. Thread B has acquired malloc_lock and is blocked on yyy_lock. The application is deadlocked. It will be noted that a deadlock could still occur with this incorrect execution order of the atfork handlers even if the first thread had been able to acquire the malloc_lock before the second thread forked.

It will also be noted that the POSIX threads standard states that it is only safe to call async-signal safe functions in the child of a multi-threaded process before the child calls exec. If it is desired to call any other library function during this window, it must be fork-safed as described above. This becomes complicated if there are many fork-safe libraries with interdependencies.

SUMMARY OF THE INVENTION

In one embodiment, the invention provides a process replication method for use in a multi-threaded computing environment, comprising acquiring and locking available mutexes from a plurality of mutexes, determining whether any unavailable mutexes from the plurality of mutexes are owned by a thread that is waiting for a mutex owned by a forking thread and, if so, ceding any such mutex to the respective waiting thread and boosting priority of the waiting thread, and registering the forking thread as first waiter for any unavailable mutexes. All of the plurality of mutexes are thereby eventually acquired and locked.

The method may additionally include determining whether a waiting thread that is waiting for a locked mutex is a forking thread and, if so, setting the ownership of the locked mutex to the waiting thread, or if not, unlocking the locked mutex and waking up the first waiting thread.

In another embodiment, the invention provides a mutex fork-safing method, comprising:
acquiring and locking available mutexes from a plurality of mutexes;
determining whether any unavailable mutexes from the plurality of mutexes are owned by a thread that is waiting for a mutex owned by a forking thread and, if so, ceding any such mutex to the respective waiting thread and boosting priority of the waiting thread; and
registering the forking thread as first waiter for any unavailable mutexes;
whereby all of the plurality of mutexes are eventually acquired and locked.

The method may include specifying the plurality of mutexes (from the totality of mutexes).

In another embodiment, the invention provides a computer readable medium provided with program data that, when executed on a computing system, implements either of the above described methods.

In still another embodiment, the invention provides a computer system, comprising:
a multi-threaded computing environment programmed or operable to:
acquire and lock available mutexes from a plurality of mutexes;
determine whether any unavailable mutexes from the plurality of mutexes are owned by a thread that is waiting for a mutex owned by a forking thread and, if so, cede any such mutex to the respective waiting thread and boost priority of the waiting thread; and
register the forking thread as first waiter for any unavailable mutexes;
wherein all of the plurality of mutexes are eventually acquired and locked.

BRIEF DESCRIPTION OF THE DRAWINGS

In order that the invention may be more clearly ascertained, embodiments will now be described, by way of example, with reference to the accompanying drawing, in which.

DETAILED DESCRIPTION OF THE EMBODIMENTS

Figure 1:
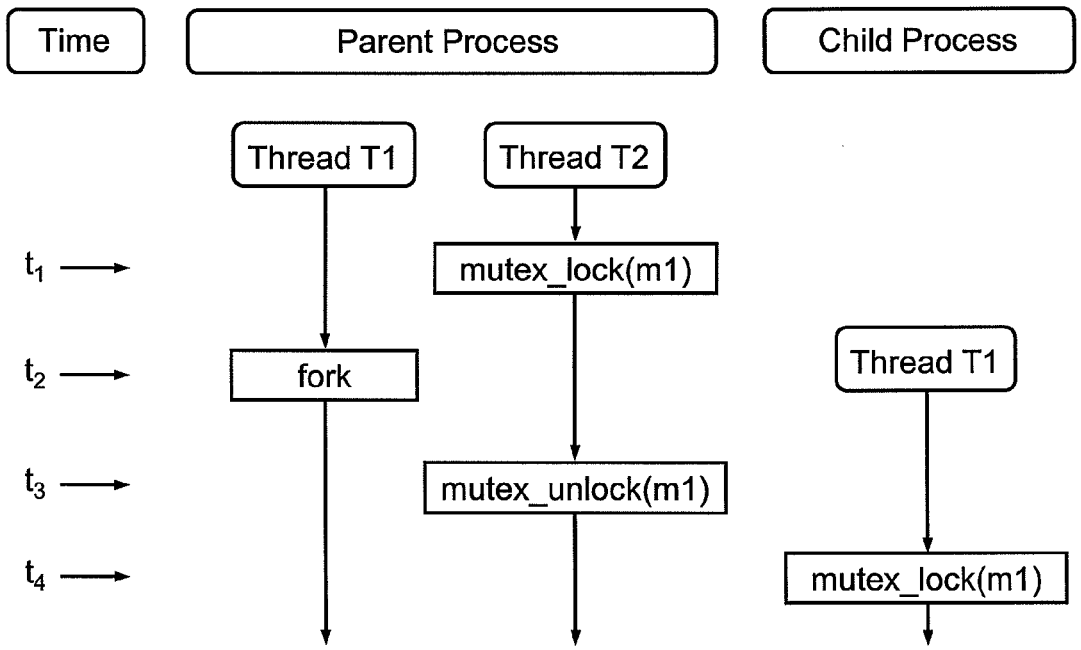
FIG. 1 is a schematic diagram of a background art thread replication implementation in which deadlocking occurs following thread replication where only the thread that called fork( ) is duplicated but another thread in the parent owns a lock.
Figure 2:
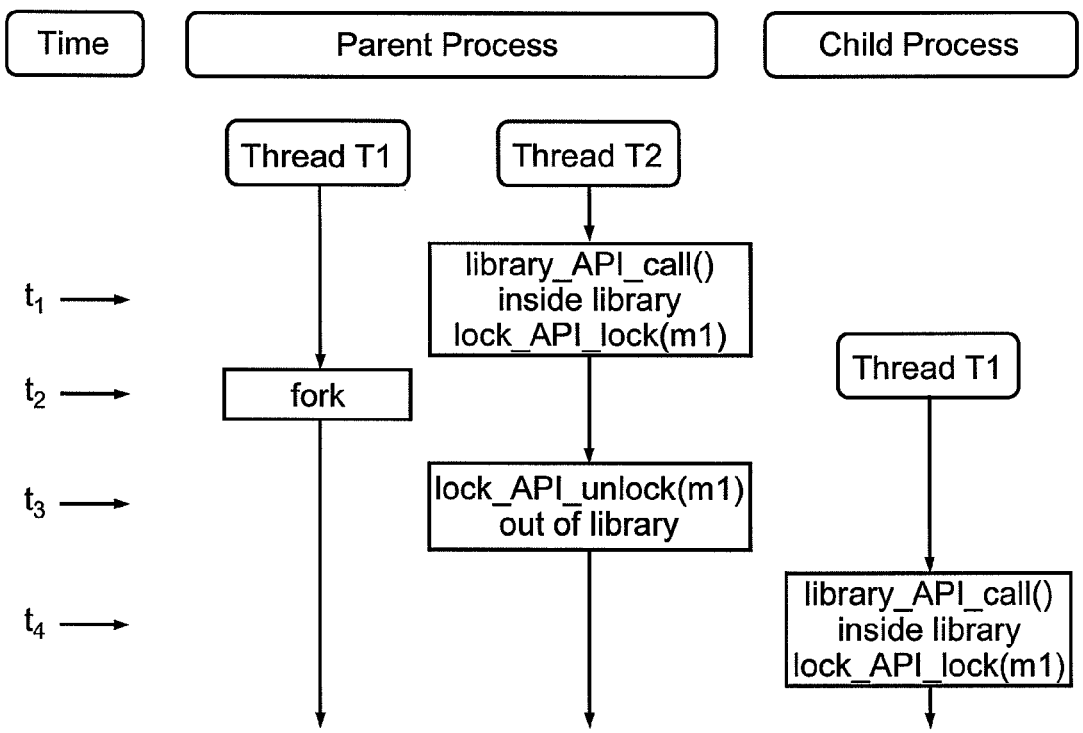
FIG. 2 is a schematic diagram of another background art thread-replication implementation, which illustrates the deadlocking of an application inside a library.
Figure 3:
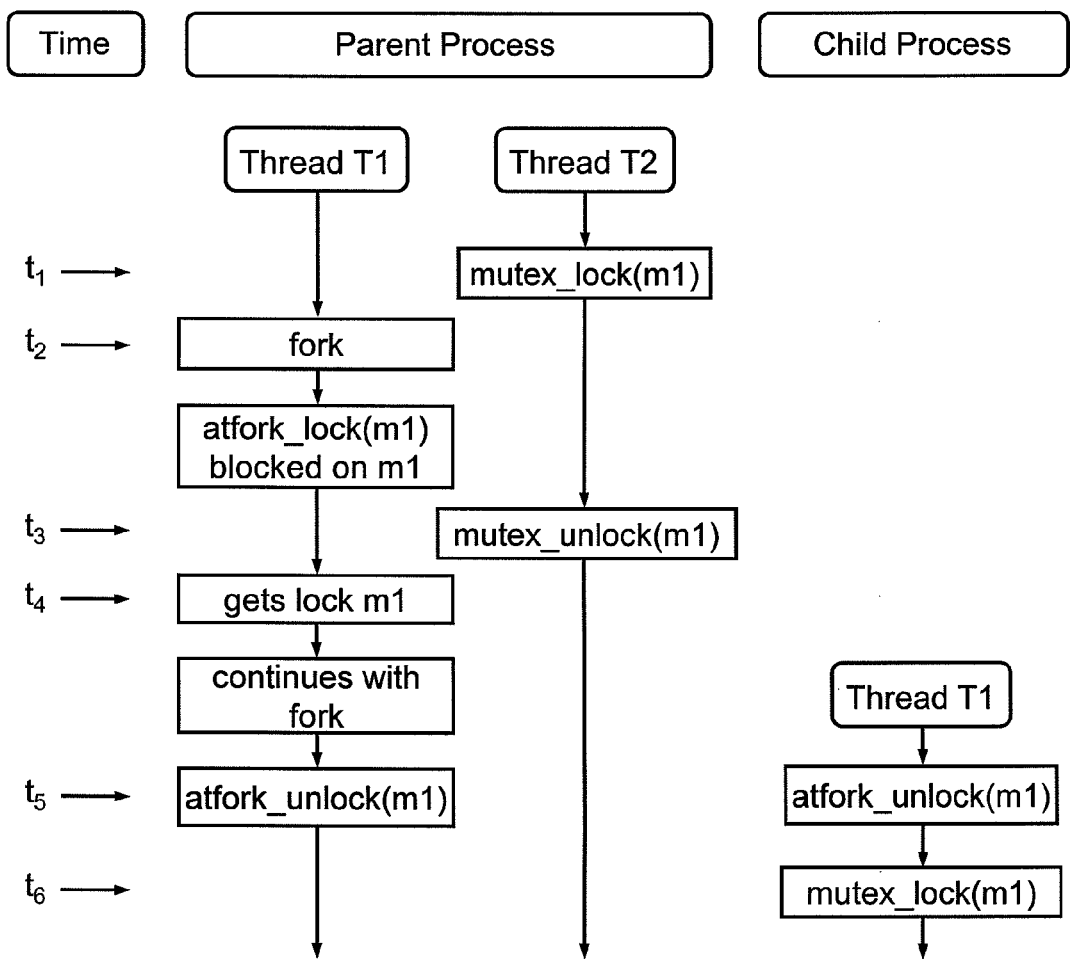
FIG. 3 is a schematic diagram of a background art thread-replication implementation for avoiding the deadlocking of an application inside a library.
Figure 4:
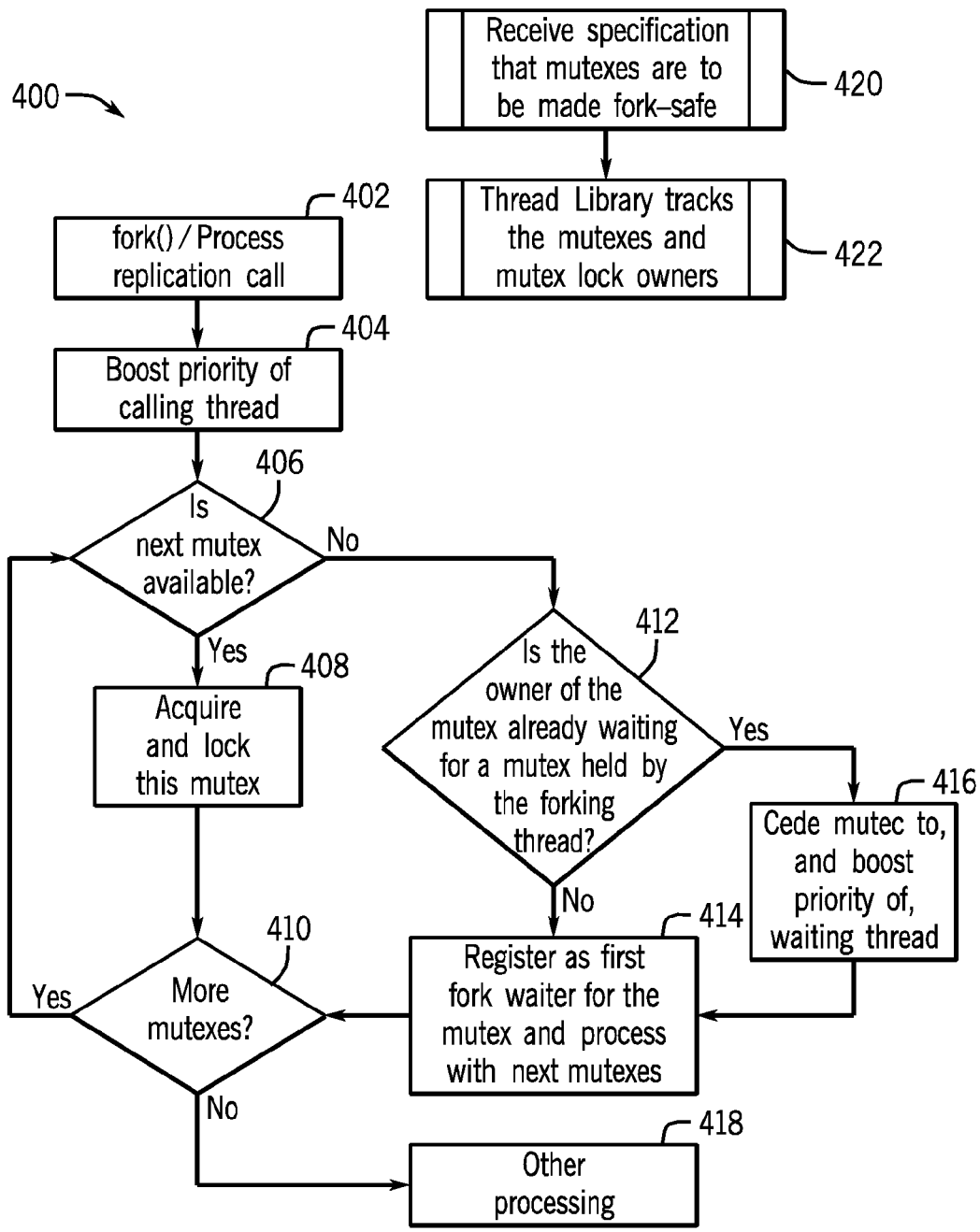
FIG. 4 is a flow diagram of a process-replication method according to an embodiment of the invention.

FIG. 4 is a flow diagram of a process-replication method 400 according to an embodiment of the present invention.

Throughout process-replication method 400, a thread library is used to keep track (422) of all mutexes and the owner information pertaining to those mutexes.

Process-replication method 400 commences at step 402, where a fork( ) is called in a multi-threaded environment, which causes process replication. Next, at step 404, the thread library performs a dynamic boosting of priority of the forking thread compared to other threads in the process.

Next, a fast, sequential locking of currently unlocked mutexes is performed, and a blocking mechanism is provided for acquiring the mutex. Thus, at step 406, the availability of each of the mutexes in the process is checked in turn. If the instant mutex is available, processing passes to step 408 where that mutex is acquired and immediately locked. At step 410, it is determined whether there are more mutexes and, if so, processing passes back to step 406.

If at step 406 it is determined that a particular mutex is unavailable, processing passes to step 412 where it is determined whether the owner of the mutex (i.e. the thread that holds that mutex) is already waiting for a mutex held by the forking thread. If not, processing passes to step 414 where the forking thread is registered as first waiter for this mutex. That is, if a lock is currently held by some other thread in the parent process, the forking thread is registered as the first waiter for that mutex and when that locked mutex is unlocked, it will set the ownership to the waiting thread. Processing then continues at step 410, so that the forking thread is permitted to proceed with further processing of the acquisition of the other mutexes in the application. This approach ensures that all the available mutexes are acquired as quickly as possible, and that the locked mutexes are obtained at the first opportunity once they are unlocked.

If, however, at step 412 the mutex is found to be held by a thread that is waiting for the mutex owned by the forking thread, processing passes to step 416 where the mutex is ceded to the waiting, target thread to avoid deadlocks and the priority of the waiting thread is boosted, so that it finishes with its critical section and releases the mutex. Processing then passes to step 414, where the forking thread adds itself as first waiter for all the held mutexes and mutex ownership is changed when the target thread unlocks the mutex.

If at step 410 it is determined that there are no more mutexes, the method is essentially complete and other processing can commence at step 418.

Note: Usually an atfork( ) handler has an order because it waits on a mutex, but in this embodiment this does not occur because method 400 does not wait on any mutex and cedes mutexes to avoid deadlock. This makes the pthread_atfork( ) mechanism order-free.

Furthermore, an application developer can specify (to cause system to receive, at 420, specification of) which mutexes should be made fork-safed; the library can then keep track (422) of these mutexes and apply the method 400 for the identified mutexes only. Alternatively, a user can make an entire application fork-safe if he or she believes that there are no locks that will be held for the duration of the process lifetime.

Figure 5:
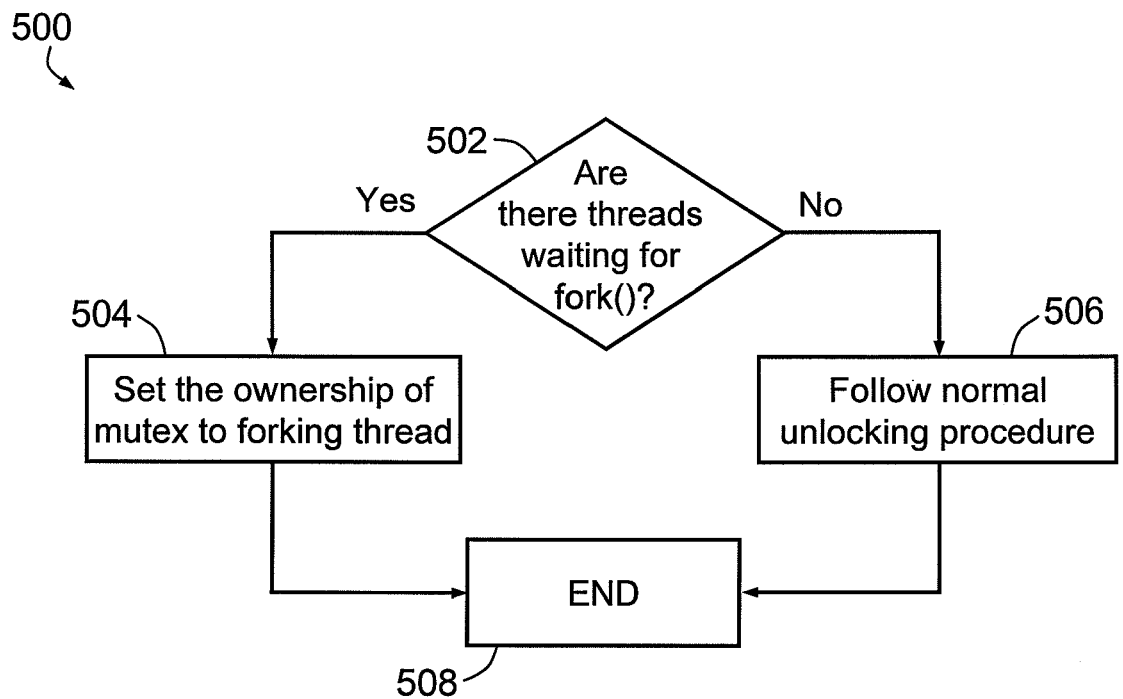
FIG. 5 is a flow diagram of unlocking according to the process replication method of FIG. 4.

FIG. 5 is a flow diagram of the procedure 500 to be followed subsequently according to this embodiment. At step 502, a thread determines whether there are any threads waiting for fork( ) (i.e. the thread checks whether the waiter is a forking thread).

If so, processing continues at step 504 where the ownership of the mutex is set to the forking thread. If not, processing continues at step 506 where the normal unlock procedure is followed. Operation 500 then ends at step 508.

The method 400 thus has the advantages of making fork operation faster in a multi-threaded environment, avoiding deadlocks because of the mutex ordering during process replication, and allowing async-signal safe functions to be called between fork( ) and exec in a child.

Figure 6:
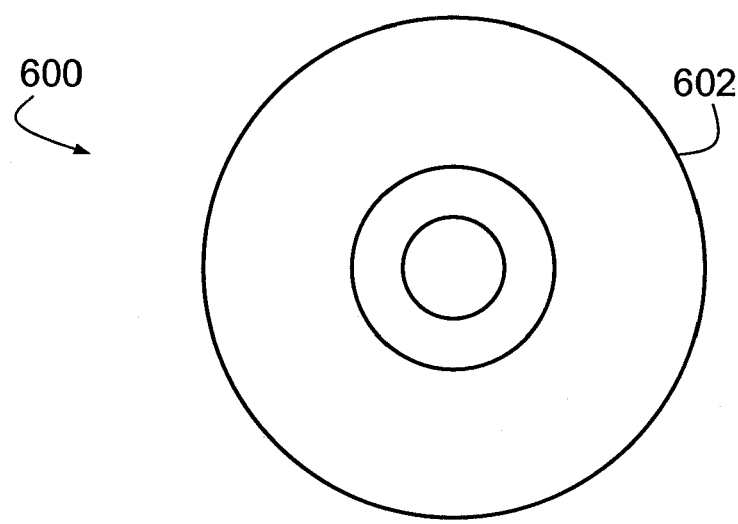
FIG. 6 is a schematic view of a data storage medium according to another embodiment of the invention.

Referring to FIG. 6, in another embodiment the necessary software for implementing the method of FIG. 4 is provided on a data storage medium 600. The data storage medium 600 is in the form of a CD-ROM 602 that contains program instructions for implementing the system of FIG. 4. It will be understood that, in this embodiment, the particular type of data storage medium may be selected according to need or other requirements. For example, instead of CD-ROM 602 the data storage medium 600 could be in the form of a magnetic medium, but essentially any data storage medium will suffice.

The foregoing description of the exemplary embodiments is provided to enable any person skilled in the art to make or use the present invention. While the invention has been described with respect to particular illustrated embodiments, various modifications to these embodiments will readily be apparent to those skilled in the art, and the generic principles defined herein may be applied to other embodiments without departing from the spirit or scope of the invention. It is therefore desired that the present embodiments be considered in all respects as illustrative and not restrictive. Accordingly, the present invention is not intended to be limited to the embodiments described above but is to be accorded the widest scope consistent with the principles and novel features disclosed herein.

The invention claimed is:

1. A process-replication method for use in a multi-threaded computing environment, comprising:
   acquiring and locking, by a forking thread, available mutexes from a plurality of mutexes, wherein the forking thread is a thread that has called a function to perform thread replication;
   determining whether an unavailable mutex from said plurality of mutexes is owned by a waiting thread that is waiting for a particular mutex owned by the forking thread and, if so, ceding the particular mutex to the waiting thread and boosting a priority of said waiting thread as compared to other threads to allow the waiting thread to finish execution; and
   after ceding the particular mutex to the waiting thread, registering the forking thread as first waiter for the unavailable mutex;
   wherein said plurality of mutexes are eventually acquired and locked by the forking thread.

2. A method as claimed in claim 1, further comprising keeping track, by a thread library, said plurality of mutexes and of owner information pertaining to said mutexes.

3. A method as claimed in claim 1, further comprising receiving a specification that said plurality of mutexes from a larger group of mutexes are to be made fork-safe.

4. A process-replication method for use in a multi-threaded computing environment, comprising:
   acquiring and locking, by a forking thread, available mutexes from a plurality of mutexes;
   determining whether an unavailable mutex from said plurality of mutexes is owned by a waiting thread that is waiting for a particular mutex owned by the forking thread and, if so, ceding the particular mutex to the waiting thread and boosting a priority of said waiting thread as compared to other threads to allow the waiting thread to finish execution;
   registering the forking thread as first waiter for the unavailable mutex,
   wherein said plurality of mutexes are eventually acquired and locked by the forking thread; and determining whether a given thread that is waiting for a locked mutex is a forking thread and, if so, setting the ownership of said locked mutex to the given thread, and if not, unlocking said locked mutex and waking up a first waiting thread to acquire the unlocked mutex.

5. A mutex fork-safing method, comprising:

acquiring and locking, by a forking thread, available mutexes from a plurality of mutexes, wherein the forking thread is a thread that has called a function to perform thread replication;

determining whether an unavailable mutex from said plurality of mutexes is owned by a waiting thread that is waiting for a particular mutex owned by the forking thread and, if so, ceding the particular mutex to the waiting thread and boosting a priority of said waiting thread as compared to other threads to allow the waiting thread to finish execution; and after ceding the particular mutex to the waiting thread, registering the forking thread as first waiter for the unavailable mutex to cause the forking thread to wait for the waiting thread to finish execution and unlock the unavailable mutex;

wherein said plurality of mutexes are eventually acquired and locked by the forking thread.

6. A method as claimed in claim 5, further comprising receiving a specification that said plurality of mutexes from a larger group of mutexes are to be made fork-safe.

7. A mutex fork-safing method, comprising:

acquiring and locking, by a forking thread, available mutexes from a plurality of mutexes;

determining whether an unavailable mutex from said plurality of mutexes are owned by a waiting thread that is waiting for a particular mutex owned by the forking thread and, if so, ceding the particular mutex to the waiting thread and boosting a priority of said waiting thread as compared to other threads to allow the waiting thread to finish execution;

registering the forking thread as first waiter for the unavailable mutex, wherein said plurality of mutexes are eventually acquired and locked by the forking thread; and determining whether a given thread that is waiting for a locked mutex is a forking thread and, if so, setting the ownership of said locked mutex to the given thread, and if not, unlocking said locked mutex and waking up a first waiting thread to acquire the unlocked mutex.

8. A computing system, comprising:

a non-transitory computer-readable storage medium storing instructions to implement a multi-threaded computing environment, wherein the instructions upon execution cause the computing system to:

cause a forking thread to acquire and lock available mutexes from a plurality of mutexes, wherein the forking thread is a thread that has called a function to perform thread replication;

determine whether an unavailable mutex from said plurality of mutexes is owned by a waiting thread that is waiting for a particular mutex owned by the forking thread and, if so, cede the particular mutex to the waiting thread and boost a priority of said waiting thread as compared to other threads to allow the waiting thread to finish execution; and after ceding the particular mutex to the waiting thread, register the forking thread as first waiter for the unavailable mutex;

wherein said plurality of mutexes are to be eventually acquired and locked by the forking thread.

9. A system as claimed in claim 8, wherein the instructions are executable to accept a specification that said plurality of mutexes from a larger group of mutexes are to be made fork-safe.

* * * * *

UNITED STATES PATENT AND TRADEMARK OFFICE
CERTIFICATE OF CORRECTION

| | | |
|---|---|---|
| PATENT NO. | : 8,108,865 B2 | Page 1 of 1 |
| APPLICATION NO. | : 11/777480 | |
| DATED | : January 31, 2012 | |
| INVENTOR(S) | : Uday Kiran Jonnala et al. | |

It is certified that error appears in the above-identified patent and that said Letters Patent is hereby corrected as shown below:

On the Title page, Item (54), and in column 1, lines 1-2, Title, delete "PROCESS REPLICATION METHOD AND SYSTEM" and insert -- ACQUIRING MUTEXES BY A FORKING THREAD --, therefor.

Signed and Sealed this
Twelfth Day of February, 2013

Teresa Stanek Rea
*Acting Director of the United States Patent and Trademark Office*